Figure 1:
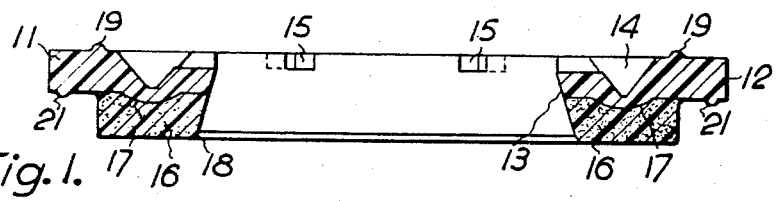

Oct. 10, 1967  F. W. BILLSON  3,346,233

SEATING RING FOR VALVES FOR THE CONTROL OF FLUIDS

Filed June 5, 1964

Inventor
Frederick W. Billson
By
Watson, Cole, Grindle + Watson
Attys.

United States Patent Office 3,346,233
Patented Oct. 10, 1967

3,346,233
SEATING RING FOR VALVES FOR THE
CONTROL OF FLUIDS
Frederick William Billson, Cwmbran, England, assignor to Saunders Valve Company Limited, Cwmbran, England, a British company
Filed June 5, 1964, Ser. No. 372,758
Claims priority, application Great Britain, June 10, 1963, 23,073/63
6 Claims. (Cl. 251—172)

This invention relates to valves including screw-down and gate valves and plug cocks, having inserted seating rings for producing the joint with the obturating member, the ring member directly or indirectly sealed to the valve casing. The invention is particularly applicable but not limited to cocks in which the plug is of spherical contour as in our patent specifications Nos. 692,085 and 843,149.

For certain services it is desirable to make the inserted seating rings of mouldable nonmetallic material such as rubber, synthetic rubber, nylon or more highly inert materials such as polytetrafluoroethylene (PTFE) and while complete rings molded in such materials have been used it has been found that stability of form at the surface of contact with the obturating member is not always satisfactory on account of flow or wear of the material. On the other hand when the rings are made of such materials the part of the ring which is directly or indirectly sealed to the valve casing provides a good seal if clamped between suitable surfaces. A direct seal may be provided by an integral flange or diaphragm clamped between suitable surfaces in the valve casing while an indirect seal may be provided by partially enclosing a suitable portion of the ring in an annular carrier which grips the ring, the carrier, usually of metal, in turn being sealed to the valve casing.

According to the present invention a part of such a ring which includes the surface which contacts with the obturating member but does not include the part which is sealed to the member which carries the ring, is reinforced with a filler in powder or fibrous form, for example metallic, slate, asbestos glass or silica in powder form or asbestos in fibrous form. In the case of rubber or synthetic rubber, ebonite particles may be used. It is found that this increases the resistance to wear and also desirably reduces the temperature coefficient of expansion. In the case of those materials such as PTFE which have a tendency to flow under changes of temperature and pressure, it also improves the stability of the part of the ring in which constant shape is important. Another advantage in the case of the more expensive materials such as PTFE is that in many cases the raw loaded material is cheaper than the unloaded material. In general the proportions of reinforcing material which can be used depends on its nature and on whether the ring needs to be machined after moulding. Thus in the case of a ring which is to be machined after moulding, if the filler is of glass or silica not more than about 10 to 15 percent by weight is feasible whereas if the filler is of stainless steel grinding up to 90 percent is possible. Again if the particles of filler are of spherical form as is usually the case with silica for example, even if the ring is not machined after moulding, the proportion should not exceed 20 to 25 percent because if it is too great, as the ring wears the particles tend to come out of the moulded material. In any particular case a suitable proportion can be ascertained by experiment.

The reinforcing material should be excluded from the part which is sealed to the carrying member, e.g., the clamped flange or gripped portion because its presence tends to reduce the value of the seal.

Figure 2:
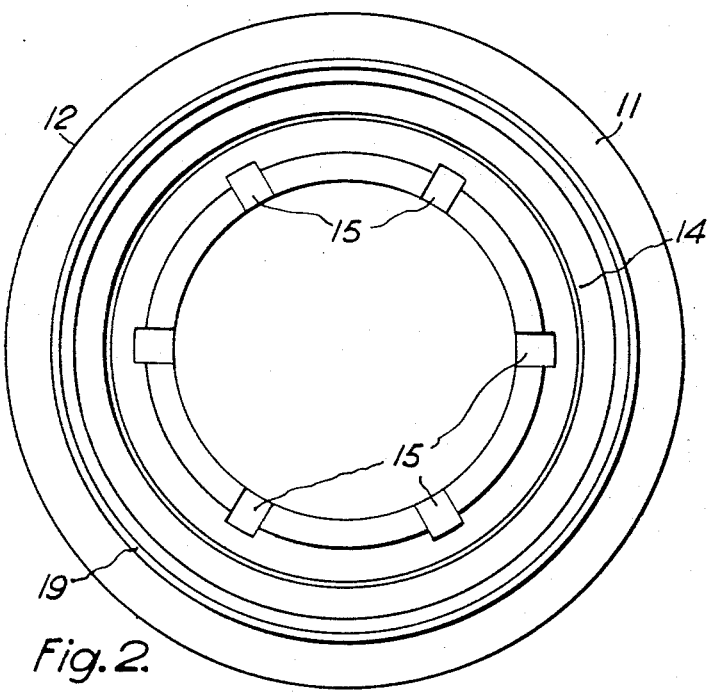
Figure 3:
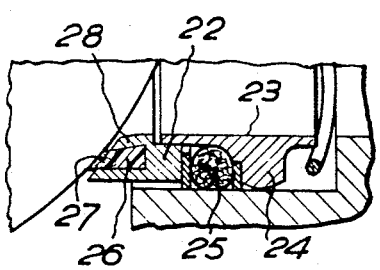

The invention will be further described with reference to the accompanying drawings in which:

FIGURE 1 is a cross section of an example of a sealing ring in accordance with the invention.
FIGURE 2 is a plan of FIGURE 1 and
FIGURE 3 is a section of a second example.

The ring shown in FIGURES 1 and 2 is intended to be sealed directly in the casing of the valve to which end it has a flange 11 to be clamped between surfaces of two parts of the valve casing which are drawn together for example by bolts. By way of example seating rings sealed in this way are shown in the case of a plug cock having a spherical seating in British patent specification Nos. 692,085 and 843,149, and in the case of a gate valve in British patent specification Nos. 700,853 and 761,986.

The ring shown in FIGURES 1 and 2 is substantially of L section and the flange 11 constitutes one limb of the L. This is made of unreinforced PTFE and extends from the outer periphery 12 to the bore 13 of the ring. There is a V-section groove 14 in the back of the ring in the part which is not clamped and radial notches 15 thereby to admit the fluid pressure to the back of the ring to press it against the plug. The V-section recess by thinning the material of the ring renders it more flexible in the region of the apex of the V, and thus has some resemblance to the subject of British patent specification No. 843,149. The remaining part 16 of the ring is reinforced with the filler material, but the boundary line between the unreinforced and reinforced portion may have a curved portion 17 which slightly increases the thickness of the unreinforced material around the apex of the V.

The bore 13 of the ring may widen a little towards the zone of contact with the plug and the latter zone may be formed by a very narrow chamfer 18.

The portion of the flange 11 which is actually clamped may present slight ribs 19, 21 on opposite faces but not opposite one another to improve the seal obtained by clamping.

FIGURE 3 illustrates a ring which is gripped in a groove in a metallic carrier member 22 and thereby sealed to the member 22. The latter is separately sealed to the valve casing suitably by some means which enables the carrier and ring to rock a little to allow for slight inaccuracies and to enable the ring to be separated from the obturating member more easily if it should stick. Thus in the illustrated example which is on the lines of a construction shown in our pending application No. 44,926/61, the carrier member 22 is located in a thrust ring 23 which has a substantially rigid rib 24 with a convex outer surface which fits with no more than working clearance in a bore in the valve casing, this bore being cylindrical in the region of the rib while towards the region of the actual seating area there is substantially greater clearance continuing far enough to enable the ring structure as a whole to rock on any transverse axis through the rib. The carrier member 22 is in this example sealed to the valve casing by an O-ring 25.

The part 26 of the ring which is gripped in the member 22 is of unreinforced PTFE while the part 27 which contacts the obturting member is reinforced as above described. To grip the part 26 in the member 22, the ring 26, 27 is made of tapering section while the member 22 is made originally with a groove of the same width in the base of the part 26 thus enabling the ring 26, 27 to be set in the groove without difficulty; the inner wall of the groove is then bent over to grip the ring.

Although the above two examples are described as of PTFE exactly the same construction can be used with nylon or other mouldable non-metallic material selected for the fluid intended to be controlled, and which will make a satisfactory seal where not reinforced and a satisfactory wearing surface where reinforced; one further such material is polyvinyl chloride. In some cases it may also be useful to include with the reinforcement a small proportion of a dry lubricant such as fine particles of graphite.

I claim:

1. A seating ring for producing a joint by sliding contact with the obturating member of a fluid controlling valve, comprising a moulding of a nonmetallic material which in unreinforced condition is slightly flexible, said moulding being of substantially L section with one limb directed radially outwardly from the bore of the ring whereby the ring is adapted to be clamped between the surfaces of two parts of the valve casing and thereby be sealed directly to the casing, and with the other limb parallel with the bore of the ring and adapted to make surface contact with the obturating member over a narrow zone characterised in that said radially directed limb right from the bore of the ring to its outermost boundary is unreinforced whereby the flexibility of the material of the ring is unimpaired while the remaining part of the ring is reinforced right up to the surface which contacts the obturating member with a particulate material in a proportion substantially to increase the wearing qualities at that surface.

2. A valve according to claim 1 in which the reinforcement is selected from the group consisting of metal, slate, asbestos, glass and silica in powder form and asbestos in fibrous form.

3. A valve according to claim 1 in which the mouldable material is nylon.

4. A valve according to claim 1 in which the mouldable material is PTFE.

5. A valve according to claim 1 made of moulded rubber-like elastomer with a reinforcement in the reinforced part of particles of ebonite.

6. A seating ring for producing a joint by sliding contact with the obturating member of a fluid controlling valve, comprising a moulding of a nonmetallic material which in unreinforced condition is slightly flexible, said moulding being of substantially L-section with one limb directed radially outwardly from the bore of the ring whereby the ring is adapted to be clamped between the surfaces of two parts of the valve casing and thereby be sealed directly to the casing, and with the other limb parallel with the bore of the ring and adapted to make surface contact with the obturating member over a narrow zone characterised in that said radially directed limb right from the bore of the ring to its outermost boundary is unreinforced whereby the flexibility of the material of the ring is unimpaired while the remaining part of the ring is reinforced right up to the surface which contacts the obturating member with a particulate material in a proportion substantially to increase the wearing qualities at that surface, the radially outwardly directed limb of the ring having a recess of V-section in the side oposite the limb parallel to the bore and the boundary between the reinforced and unreinforced parts of the ring being curved away from the apex of the V-section of the recess.

References Cited

UNITED STATES PATENTS

| 2,234,625 | 3/1941 | Diehl et al. | 277—277 |
| 2,373,925 | 4/1945 | Townhill | 251—309 X |
| 2,732,170 | 1/1956 | Shand | 251—174 X |
| 2,903,235 | 9/1959 | Rodgers et al. | 251—358 X |

FOREIGN PATENTS

| 484,373 | 6/1952 | Canada. |
| 855,184 | 11/1952 | Germany. |
| 843,149 | 8/1960 | Great Britain. |

M. CARY NELSON, *Primary Examiner.*

HENRY T. KLINKSIEK, *Examiner.*